United States Patent
Kong et al.

(10) Patent No.: US 10,220,552 B2
(45) Date of Patent: Mar. 5, 2019

(54) APPARATUS AND METHOD FOR MANUFACTURING INTERIOR PART OF VEHICLE

(71) Applicants: Hyundai Motor Company, Seoul (KR); Kia Motors Corporation, Seoul (KR)

(72) Inventors: Byung Seok Kong, Gunpo-Si (KR); Jong Sik Bae, Suwon-Si (KR); Hee Jun Jeong, Hwaseong-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 396 days.

(21) Appl. No.: 14/956,277

(22) Filed: Dec. 1, 2015

(65) Prior Publication Data
US 2016/0354956 A1     Dec. 8, 2016

(30) Foreign Application Priority Data

Jun. 3, 2015   (KR) .................. 10-2015-0078424

(51) Int. Cl.
| | |
|---|---|
| *B29C 44/34* | (2006.01) |
| *G01L 19/00* | (2006.01) |
| *B29C 44/60* | (2006.01) |
| *B29C 44/12* | (2006.01) |
| *B29K 75/00* | (2006.01) |

(Continued)

(52) U.S. Cl.
CPC ........ *B29C 44/351* (2013.01); *B29C 44/1238* (2013.01); *B29C 44/60* (2013.01); *G01L 19/00* (2013.01); *B29C 44/1257* (2013.01); *B29K 2075/00* (2013.01); *B29K 2105/04* (2013.01); *B29K 2627/06* (2013.01); *B29L 2031/3005* (2013.01); *B29L 2031/3041* (2013.01)

(58) Field of Classification Search
CPC ...................................... B29C 44/351
See application file for complete search history.

(56) References Cited

U.S. PATENT DOCUMENTS

| | | | |
|---|---|---|---|
| 5,657,972 A * | 8/1997 | Blatt ............... | B25B 5/065 269/22 |
| 6,123,356 A | 9/2000 | Gray et al. | |

(Continued)

FOREIGN PATENT DOCUMENTS

| | | |
|---|---|---|
| EP | 1 431 020 A1 | 6/2004 |
| FR | 2 891 185 A1 | 3/2007 |

(Continued)

*Primary Examiner* — Monica A Huson
*Assistant Examiner* — Kelsey C Grace
(74) *Attorney, Agent, or Firm* — Morgan, Lewis & Bockius LLP

(57) ABSTRACT

An apparatus for manufacturing an interior part of a vehicle may include a pressure sensor disposed at a position on a surface of a base of the interior part at which a foaming pressure of a foam material is detected, a tube controlling an expanding pressure, disposed on a surface of a skin layer of the interior part to press against the base, and a tube pressure controller for controlling the expanding pressure of the tube, which causes the skin layer to be pressed to the surface of the base, relative to the foaming pressure of the foam material detected by the pressure sensor during foaming of the foam material, to block leakage of the foam material.

9 Claims, 2 Drawing Sheets

(51) Int. Cl.
  *B29K 105/04*    (2006.01)
  *B29K 627/06*    (2006.01)
  *B29L 31/30*     (2006.01)

(56) References Cited

U.S. PATENT DOCUMENTS

| | | | |
|---|---|---|---|
| 6,517,649 B1* | 2/2003 | Rugg .................. | B29C 51/46 |
| | | | 156/286 |
| 6,991,841 B2* | 1/2006 | Cowelchuk ......... | B29C 44/1257 |
| | | | 296/146.7 |
| 8,568,858 B2 | 10/2013 | Koetter et al. | |
| 2002/0195735 A1* | 12/2002 | Mizouchi .............. | B29C 43/003 |
| | | | 264/40.3 |
| 2005/0210709 A1* | 9/2005 | Labonte ............... | A43B 5/1666 |
| | | | 36/89 |

FOREIGN PATENT DOCUMENTS

| | | |
|---|---|---|
| JP | 4-169353 A | 6/1992 |
| JP | 2000-246742 A | 9/2000 |
| JP | 2004-202984 A | 7/2004 |
| KR | 10-2004-0076740 A | 9/2004 |
| KR | 10-2004-0083049 A | 9/2004 |
| KR | 10-2005-0089749 A | 9/2005 |

* cited by examiner

ⓐ : POINT WHEN FOAM MATERIAL REACHES PRESSURE SENSOR
ⓑ : POINT WHEN FOAM MATERIAL REACHES SEALING PORTION

APPARATUS AND METHOD FOR MANUFACTURING INTERIOR PART OF VEHICLE

CROSS-REFERENCE TO RELATED APPLICATION

The present application claims priority to Korean Patent Application No. 10-2015-0078424 filed Jun. 3, 2015, the entire contents of which is incorporated herein for all purposes by this reference.

BACKGROUND OF THE INVENTION

Field of the Invention

The present invention relates to an apparatus and method for manufacturing an interior part of a vehicle. More particularly, it relates to an apparatus and method for manufacturing an interior part of a vehicle, such as a crash pad, which is configured to prevent sealing portions of skin and foamed layers of the crash pad from being separated from a base due to reduction in adhesiveness.

Description of Related Art

Among parts representative of an interior part of a vehicle, a crash pad, which is disposed in front of a driver's seat and a front passenger's seat and defines the boundary with respect to a windshield glass, may be proposed.

Such crash pads have different designs in accordance with the types of vehicles, and are installed at the area in front of a driver's seat and a front passenger's seat, excluding a center fascia panel and the like, on which a cluster, a head unit, an air conditioner and the like are mounted.

The crash pad is made of a material serving to define the functional appearance of a vehicle and capable of absorbing impact. The crash pad is made of Polyvinyl chloride (PVC), Thermoplastic Poly Urethane (TPU) or the like, which are representative thermoplastic materials.

The conventional process of manufacturing a crash pad, which is an interior part of a vehicle, will be described as follows.

FIGS. 1 and 2 of the accompanying drawings are schematic cross-sectional views illustrating a conventional crash pad and a conventional method of manufacturing the same.

As shown in FIGS. 1 and 2, the crash pad 110 includes a base 112 constituting a framework of the crash pad 110, a foamed layer 14 formed on the base 112, and a skin layer 116 defining the appearance of the crash pad to protect the foamed layer 114.

The foamed layer 114 is made of a polyurethane material, and the skin layer 116 is made of a PVC material and shaped in accordance with the design of the vehicle.

In order to manufacture the conventional crash pad 110, the base 112 constituting the framework of the crash pad and the skin layer 16 defining the appearance of the crash pad are first prepared in a predetermined shaping manner in accordance with the design of the vehicle.

Preferably, the skin layer 116 is made of a PVC material including a predetermined amount of plasticizer so as to impart a soft feeling and shock resistance to the crash pad.

Subsequently, a polyurethane foam material is disposed on the base 112, and then the skin layer 116 is disposed on the polyurethane foam material.

A sealing foam tape 118 adheres to the mating marginal surfaces of the base 112 and the skin layer 116, that is, the upper marginal surface of the base 112 and the lower marginal surface of the skin layer 16, in order to prevent the leakage of the foam material after foaming.

Accordingly, a hermetic space is defined between the base 112 and the skin layer 116 by virtue of the sealing foam tape 118, and the foam material is disposed in the hermetic space.

Subsequently, on a predetermined form condition, the foam material present between the base 112 and the skin layer 116 is foamed, and thus the hermetic space between the base 112 and the skin layer 116 is completely filled with the foamed layer 114.

However, the conventional process of manufacturing a crash pad has the following problems.

As shown in FIG. 1, since the foaming pressure of the foam material disposed between the base and the skin layer is higher than the adhesive force of the sealing foam tape, which sticks the base and the skin layer at the time of foaming of the foam material, the foam material may leak to the outside through the sealing foam tape, which results in a defective foamed layer, thereby significantly lowering the quality of the resulting crash pad.

When the foam material disposed between the base and the skin layer is foamed, air in the foaming space cannot escape therefrom due to the sealing foam tape, and the resulting foamed layer may include air bubbles therein, thereby lowering the foaming quality and durability of the foamed layer.

As shown in FIG. 2, the skin layer of the crash pad includes a predetermined amount of plasticizer in order to impart a soft feeling and shock resistance to the crash pad. When the crash pad has aged after the lapse of a certain period of time, the plasticizer migrates into the sealing foam tape, thereby significantly reducing the adhesive force of the sealing foam tape. As a result, the sealing foam tape having the reduced adhesive force and the adjacent skin layer and foamed layer are lifted and separated from the base, thereby significantly reducing the durability of the crash pad.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an apparatus and method of manufacturing an interior part of a vehicle such as a crash pad, which is configured to prevent the separation of a skin layer and foamed layer from a base, and additionally to prevent the leakage of a foam material by installing a pressure sensor for detecting the foaming pressure of a foam material at the base constituting the crash pad, disposing a tube capable of controlling an expanding pressure at a marginal surface of the skin layer and controlling the expanding pressure of the tube, which causes the skin layer to be pressed to the surface of the base, relative to the foaming pressure of the foam material during foaming of the foam material, to a desired degree.

According to various aspects of the present invention, an apparatus for manufacturing an interior part of a vehicle may include a pressure sensor disposed at a position on a surface of a base of the interior part at which a foaming pressure of a foam material is detected, a tube controlling an expanding pressure, disposed on a surface of a skin layer of the interior part to press against the base, and a tube pressure controller for controlling the expanding pressure of the tube, which causes the skin layer to be pressed to the surface of the base, relative to the foaming pressure of the foam material detected by the pressure sensor during foaming of the foam material, to block leakage of the foam material.

The base of the interior part may include a plurality of sealing protrusions formed at a position of the surface thereof at which the skin layer is closely pressed against the base, so as to block leakage of the foam material.

The plurality of sealing protrusions of the base may define therebetween trenches for confining the foam material therein.

The apparatus may further include a double-sided adhesive tape adhering to a surface area of the skin layer that contacts the plurality of sealing protrusions of the base.

According to various aspects of the present invention, a method of manufacturing an interior part of a vehicle may include disposing a tube controlling an expanding pressure to a position on a surface of a skin layer of an interior part at which a base of the interior part is pressed, detecting a foaming pressure of a foam material disposed between the base and the skin layer of an interior part crash pad during foaming of the foam material, and controlling the expanding pressure of the tube, which causes the skin layer to be pressed to the base, to such a degree as to discharge air and to block leakage of the foam material during foaming of the foam material, based on the detected foaming pressure.

In the controlling the expanding pressure of the tube, the expanding pressure of the tube, which causes the skin layer to be pressed against the base, may be controlled to such a degree as to provide a clearance between the skin layer and the base so as to allow air in a foaming space defined between the base and the skin layer to be discharged to an outside.

The controlling the expanding pressure of the tube to such a degree as to provide a clearance between the skin layer and the base may be performed until the foam material reaches the clearance between the skin layer and the base due to foaming of the foam material.

The controlling the expanding pressure of the tube, which causes the skin layer to be pressed against the base, to such a degree as to block leakage of the foam material may be performed from when the foam material reaches the clearance between the skin layer and the base due to foaming of the foam material.

The controlling the expanding pressure of the tube to such a degree as to block leakage of the foam material may be performed to cause the skin layer to adhere to the base.

It is understood that the term "vehicle" or "vehicular" or other similar term as used herein is inclusive of motor vehicles in general, such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

The pressure sensor for detecting a foaming pressure of the foam material is installed in the base constituting the crash pad, and the tube capable of controlling expanding pressure is disposed on the marginal surface of the skin layer. Since the expanding pressure of the tube, which causes the skin layer to be pressed to the surface of the base, is controlled to be higher than the foaming pressure of the foam material during the foaming procedure, the leakage of the foam material can be blocked. In addition, since the bonding force between the skin layer and the base is increased, it is possible to prevent separation of the skin layer or the foamed layer from the base.

Furthermore, since the expanding pressure of the tube, which causes the skin layer to be pressed to the surface of the base, is controlled to such a degree as to discharge air present in the foaming space defined between the skin layer and the base, it is possible to prevent the generation of air holes in the foamed layer.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
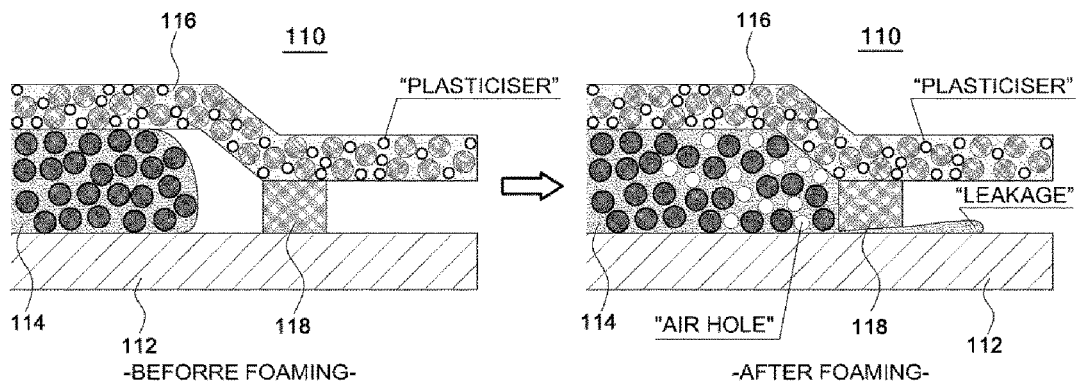
FIG. 1 and FIG. 2 are schematic cross-sectional views illustrating a conventional process of manufacturing a crash pad according to the related art.
Figure 2:
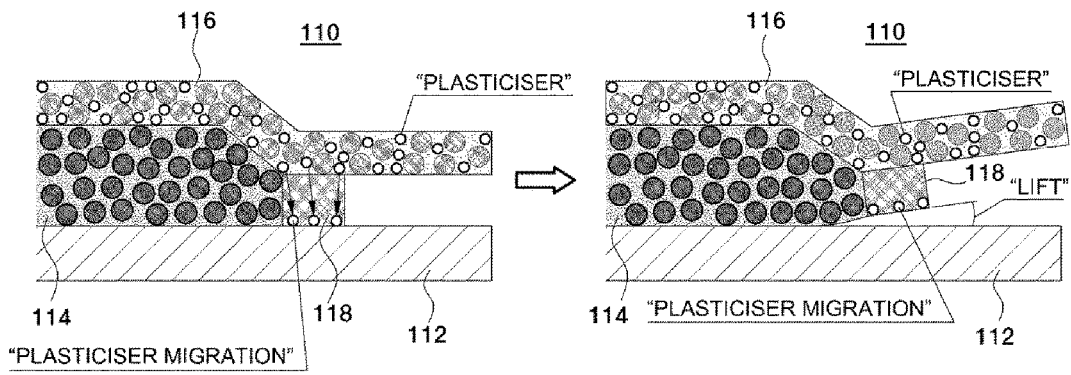
Figure 3:
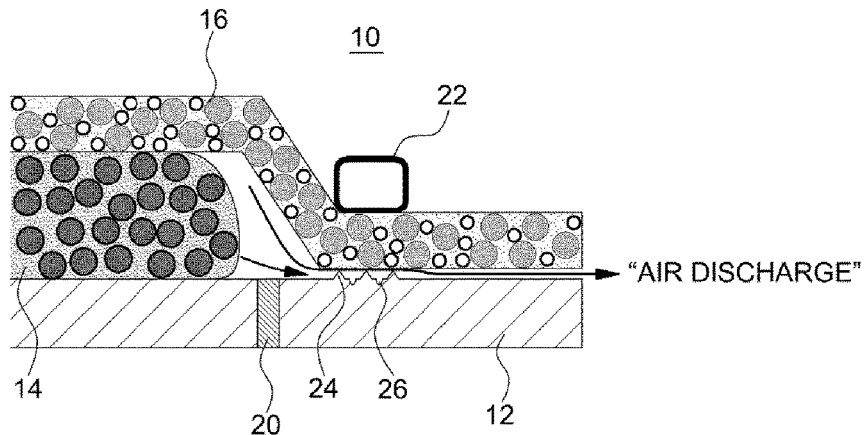
FIG. 3 and FIG. 4 are schematic cross-sectional views illustrating the apparatus and method for manufacturing an exemplary crash pad according to the present invention.
Figure 4:
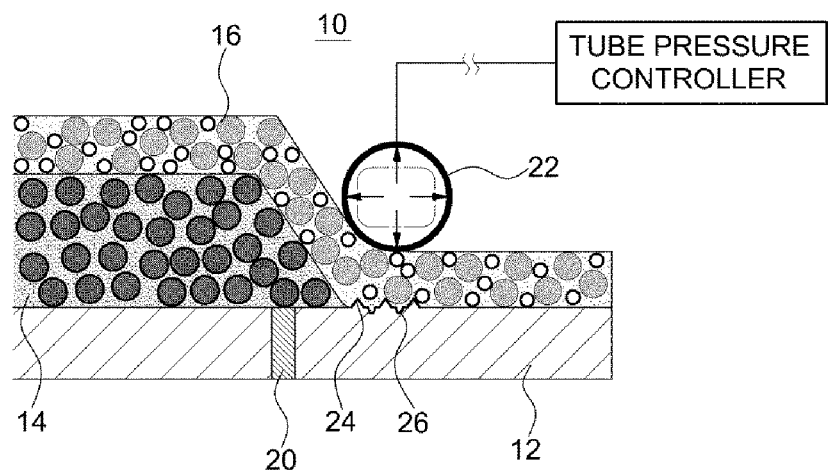

FIGS. 3 and 4 of the accompanying drawings are schematic cross-sectional views showing an apparatus and method for manufacturing a crash pad according to the present invention.

As shown in FIGS. 3 and 4, the crash pad 10 includes a base 12 comprising the framework of the crash pad, a foamed layer 14 formed on the base 12, and a skin layer 16 defining the appearance of the crash pad to protect the foamed layer 14.

In various embodiments, the foamed layer 14 is made of a polyurethane material so as to impart a soft feeling and shock resistance to the crash pad, and the skin layer 16 is made of a PVC material and shaped in accordance with the design of the vehicle.

In order to manufacture the crash pad 10, the base 12 comprising the framework of the crash pad and the skin layer 16 defining the appearance of the crash pad are first prepared in a predetermined shaping manner suitable for the design of the vehicle.

Subsequently, the polyurethane foam material that is to form the foamed layer 14 after foaming is disposed on the base 12, and then the skin layer 16 is disposed on the polyurethane foam material.

Then, a pressure sensor 20 is installed at a specific position on the surface of the base 12 of the crash pad 10 at which a foaming pressure is detected during the foaming procedure, preferably a specific position on the entire surface of the base 12 which is immediately adjacent to a marginal region at which the skin layer 16 is bonded to the base 12.

A tube 22 controlling expanding pressure exerted on the surface of the skin layer 16 (for example, a rubber tube into which air can be injected) is disposed at a specific position on the surface of the skin layer 16 of the crash pad 10, that is, the marginal position of the skin layer 16 at which the skin layer 16 can be pressed to the base 12.

Although not shown, the tube 22 is connected to a unit for providing air pressure (for example, a compressor), which is configured to be driven by a tube pressure controller.

The tube pressure controller serves to control the number of stages or the discharge pressure of the unit for providing air pressure so as to control the expanding pressure of the tube 22 based on the detected value of the pressure sensor 20.

A plurality of sealing protrusions 24 for blocking leakage of the foam material are formed in the marginal area on the surface of the base 12 to which the skin layer 16 is closely pressed. Preferably, the plurality of sealing protrusions 24 of the base 12 are further provided therebetween with trenches 26 to confine leaking foam material therein. A piece of double-sided adhesive tape may adhere to the surface area of the skin layer that contacts the plurality of sealing protrusions of the base.

Subsequently, the foam material present in the space defined between the base 12 and the skin layer 16 is caused to be foamed under predetermined foaming conditions, and, as such, the foamed layer 14 is formed in the space defined between the base 12 and the skin layer 16.

At the same time, the operation of controlling the expanding pressure of the tube 22 is performed by the tube pressure controller so as to cause air responsible for bubbles in the foamed layer 14 to be discharged to the outside and then to block leakage of the foam material to the outside.

More specifically, the pressure sensor 20 detects the foaming pressure of the foam material during the foaming procedure and then sends the foaming pressure to the tube pressure controller. When the foaming pressure is determined to be lower than the maximum value, the tube pressure controller drives the air pressure providing unit (for example, in a lower stage) to control the expanding pressure of the tube 22 such that a clearance is maintained between the base 12 and the skin layer 16, thus allowing air in the foaming space to be discharged to the outside through the clearance between the base 12 and the skin layer 16.

Figure 5:
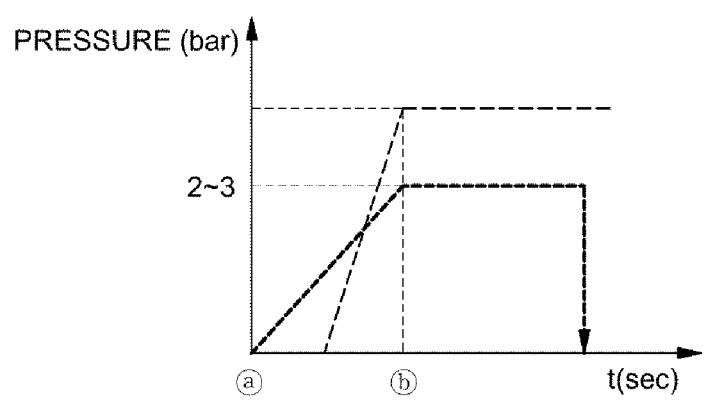
FIG. 5 is a graph illustrating an example of controlling a tube pressure in the manufacture of the exemplary crash pad according to the present invention.

The foaming pressure that is lower than the maximum value means the foaming pressure that is detected by the pressure sensor 20 from the starting point of foaming of the foam material (time point ⓐ in FIG. 5) to the maximum value of foaming pressure (time point ⓑ in FIG. 5).

Meanwhile, the maximum value of foaming pressure means the foaming pressure of the foam material that is detected by the pressure sensor 20 when the foam material reaches the clearance position between an area of the base 12 outwardly adjacent to the pressure sensor 20 and the skin layer 16 due to the foaming of the foam material (point ⓑ in FIG. 5).

The operation of controlling the expanding pressure of the tube to a degree that maintains the gap between the base 12 and the skin layer 16 is continued until the foam material reaches the clearance position between the base 12 and the skin layer 16 due to the foaming of the foam material. Consequently, air confined within the foaming space may be completely discharged to the outside through the clearance between the base 12 and the skin layer 16, and, as such, the formation of air holes in the foamed layer 14 may be easily prevented, as shown in FIG. 3.

When the foaming pressure that is detected by the pressure sensor 20 during the foaming procedure of the foam material and sent to the tube pressure controller is determined to reach the maximum value, that is, when the foam material reaches the clearance between the base 12 and the skin layer 16 due to the foaming of the foam material, the operation of controlling the expanding pressure of the tube 22 by the tube pressure controller to a degree such that the leakage of the foam material is blocked is performed.

In other words, the operation of controlling the expanding pressure of the tube 22, which presses the skin layer 16 to the base 12, to be higher than the foaming pressure of the foam material detected by the pressure sensor 20 is performed from the time when the foam material reaches the clearance between the base 12 and the skin layer 16 due to foaming of the foam material (point ⓑ in FIG. 5).

To this end, the tube pressure controller drives the air pressure providing unit (for example, in a higher stage) such that the expanding pressure of the tube 22, which presses the skin layer 16 to the base 12, is controlled to be higher than the expanding pressure of the foam material. As a result, the pressure applied to the skin layer 16 by the expanding pressure of the tube 22 is increased to be higher than the foaming pressure of the foam material, so that the clearance between the base 12 and the skin layer 16 is eliminated, thereby easily blocking leakage of the foam material.

Furthermore, when the skin layer 16 is closely pressed to the base 12 due to the expanding pressure of the tube 22, the plurality of sealing protrusions 24 formed on the surface of the base 12 are forcefully embedded in the skin layer 16 and thus the clearance between the base 12 and the skin layer 16 is completely eliminated, as shown in FIG. 4. Consequently, it is possible to completely block the leakage of the foam material.

In addition, even though the leakage of the foam material occurs while the plurality of sealing protrusions 24 are pressed in the skin layer 16, the leaking foam material is confined in the trenches 26, thereby completely blocking the outward leakage of the foam material.

When the expanding pressure of the tube 22 is controlled to such a degree as to block the leakage of the foam material, the operation of bonding the skin layer 16 to the base 12 is concurrently performed.

In other words, the marginal area of the base 12 and the corresponding marginal area of the skin layer 16 may be bonded to each other by virtue of the foam material present on the sealing protrusions 24 while the sealing protrusions 24 of the base 12 are pressed into the skin layer 16 due to the expanding pressure of the tube 22.

The present invention will provide the following effects.

The pressure sensor for detecting the foaming pressure of the foam material is installed in the base constituting the crash pad, and the tube capable of controlling the expanding pressure is disposed on the marginal surface of the skin layer. Since the expanding pressure of the tube, which causes the skin layer to be pressed to the surface of the base, is controlled to be higher than a foaming pressure of the foam material during the foaming procedure, the leakage of the foam material can be blocked. In addition, since the bonding force between the skin layer and the base is increased, it is possible to prevent the separation of the skin layer or the foamed layer from the base.

Furthermore, since the expanding pressure of the tube, which causes the skin layer to be pressed to the surface of the base, is controlled to such a degree as to discharge air present in the foaming space defined between the skin layer and the base, it is possible to prevent the generation of air holes in the foamed layer.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for manufacturing an interior part of a vehicle, comprising:
   a pressure sensor disposed at a position on a surface of a base of the interior part at which a foaming pressure of a foam material is detected;
   a tube exerting an expanding pressure, wherein the tube is disposed on a surface of a skin layer of the interior part to press against the base with the expanding pressure; and
   a tube pressure controller for controlling the expanding pressure of the tube, wherein the expanding pressure of the tube is controlled to be higher than the foaming pressure of the foam material and causes the skin layer to be pressed to the surface of the base relative to the foaming pressure of the foam material detected by the pressure sensor during foaming of the foam material, to block leakage of the foam material.

2. The apparatus of claim 1, wherein the base of the interior part includes a plurality of sealing protrusions formed at a position of the surface thereof at which the skin layer is closely pressed against the base, so as to block leakage of the foam material.

3. The apparatus of claim 2, wherein the plurality of sealing protrusions of the base define therebetween trenches for confining the foam material therein.

4. The apparatus of claim 2, further comprising a double-sided adhesive tape adhering to a surface area of the skin layer that contacts the plurality of sealing protrusions of the base.

5. A method of manufacturing an interior part of a vehicle, comprising:
   disposing a tube controlling an expanding pressure to a position on a surface of a skin layer of an interior part at which a base of the interior part is pressed;
   detecting a foaming pressure of a foam material disposed between the base and the skin layer of an interior part crash pad during foaming of the foam material; and
   controlling the expanding pressure of the tube, to be higher than the foaming pressure of the foam material and to cause the skin layer to be pressed to the base, to such a degree as to discharge air and to block leakage of the foam material during foaming of the foam material, based on the detected foaming pressure.

6. The method of claim 5, wherein, in the controlling the expanding pressure of the tube, the expanding pressure of the tube, which causes the skin layer to be pressed against the base, is controlled to such a degree as to provide a clearance between the skin layer and the base so as to allow air in a foaming space defined between the base and the skin layer to be discharged to an outside.

7. The method of claim 6, wherein the controlling the expanding pressure of the tube to such a degree as to provide a clearance between the skin layer and the base is performed until the foam material reaches the clearance between the skin layer and the base due to foaming of the foam material.

8. The method of claim 5, wherein the controlling the expanding pressure of the tube, which causes the skin layer to be pressed against the base, to such a degree as to block leakage of the foam material is performed from when the foam material reaches the clearance between the skin layer and the base due to foaming of the foam material.

9. The method of claim 5, wherein the controlling the expanding pressure of the tube to such a degree as to block leakage of the foam material is performed to cause the skin layer to adhere to the base.

* * * * *